Ellis & Gordon.
Excavator.
No. 11,323.   Patented Jul. 18, 1864.
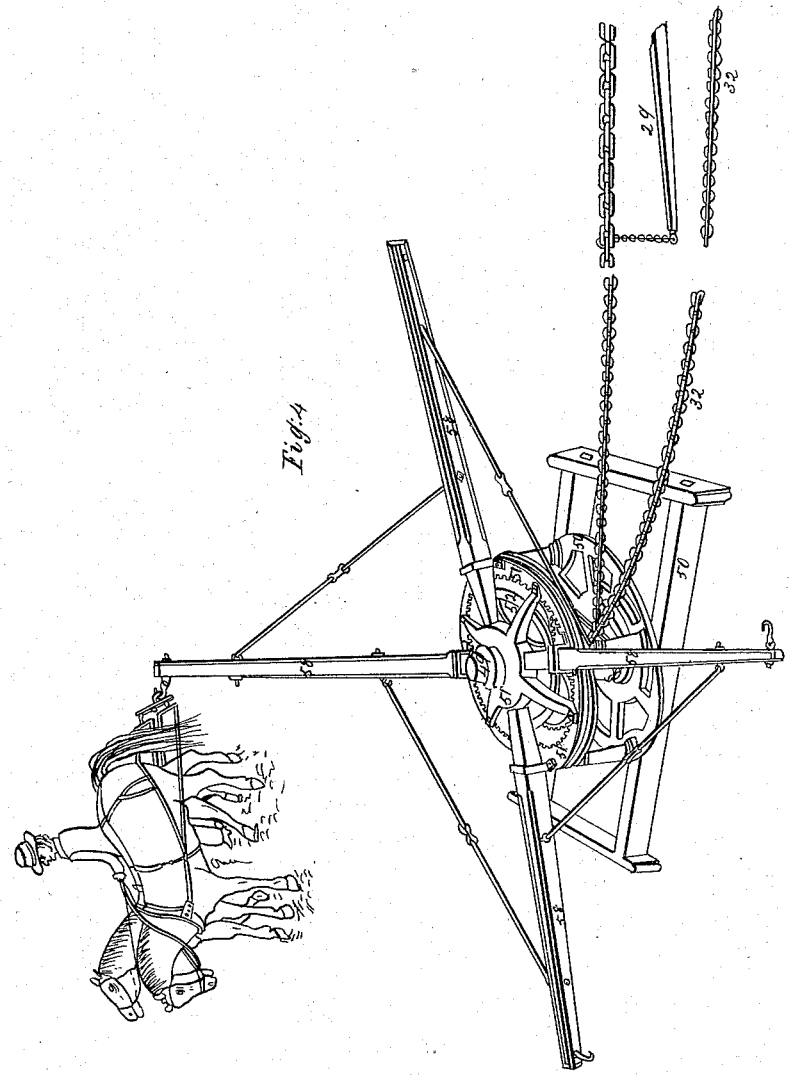

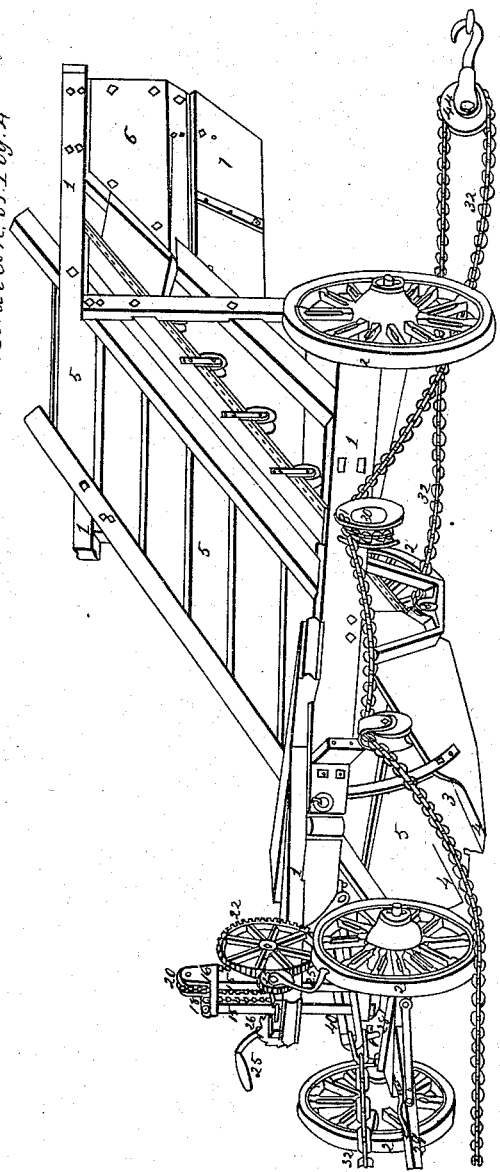
Ellis & Gordon.
Excavator.
N° 11,323.   Patented Jul. 18, 1854.

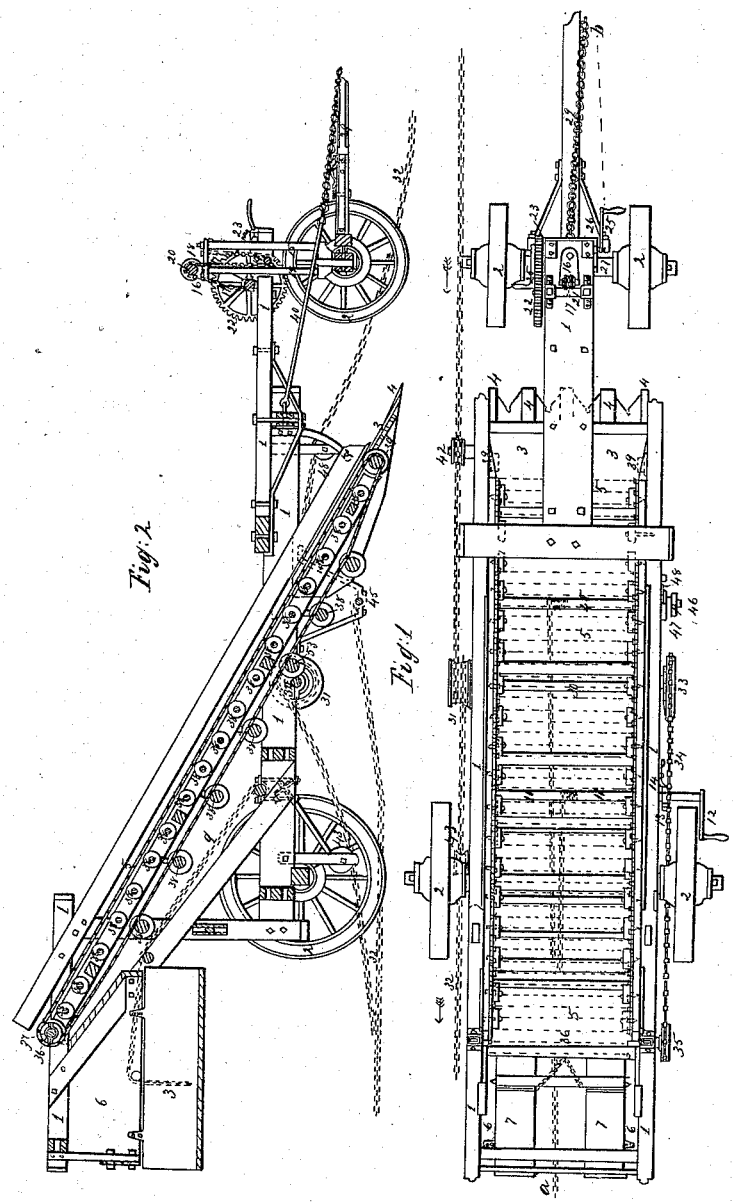

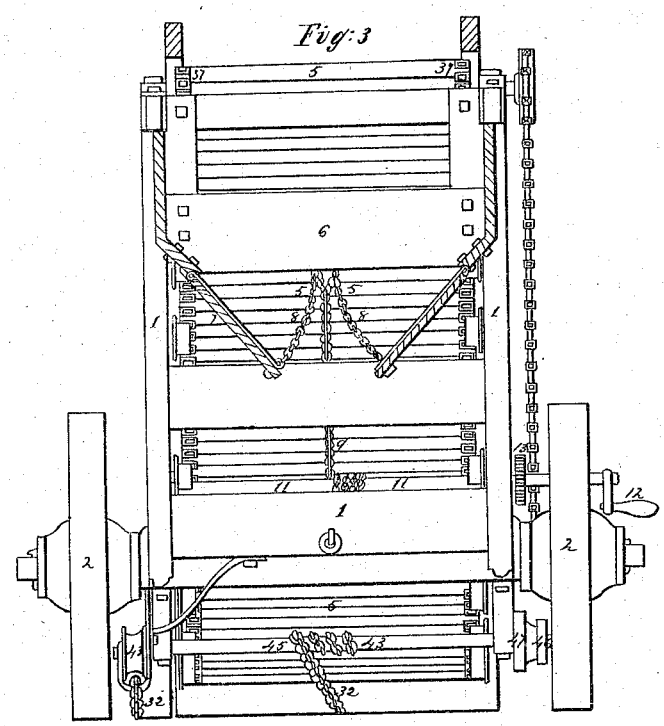

UNITED STATES PATENT OFFICE.

J. A. H. ELLIS AND A. GORDON, OF ROCHESTER, NEW YORK.

MODE OF OPERATING EXCAVATING-MACHINES.

Specification of Letters Patent No. 11,323, dated July 18, 1854.

*To all whom it may concern:*

Be it known that we, JOEL A. H. ELLIS and ALEXANDER GORDON, both of the city of Rochester, in the county of Monroe and State of New York, have invented certain new and useful Improvements in Machines for Excavating Earth, &c.; and we do hereby declare the following to be a full, clear, and exact description of the same, reference being had to the accompanying drawings, making a part thereof, in which—

Figure 1, denotes a ground plan. Fig. 2, denotes a vertical longitudinal section taken at the red line $a$, $b$, of Fig. 1. Fig. 3 denotes an end elevation, and Fig. 4, denotes a perspective view of the machine complete with the appliances for operating it.

Similar characters in the several figures denote like parts.

The nature of our invention consists, first, in placing the excavator within the circuit of an endless chain, which passes over a pulley anchored at one point, and over or around a capstan at another point, so that the excavator shall form a part of the endless chain or circuit, and be drawn forward or backward by it at pleasure. Also in attaching one or both ends of the chain to a drum or shaft connected with the machine, so that the slack of the chain may be taken upon said drum or pulley shaft, to cause the machine to move steadily, without sudden jerkings; or to let out the chain when it becomes necessary to draw it out of its direct line for guiding the machine in any desired direction when moving forward or backward. Also, in giving the chain one or more turns around the pulley of the shaft which gives motion to the endless carrying apron, for the purpose of operating said apron with a speed relatively the same as that of the machine itself.

To enable others skilled in the art to make and use our invention we will proceed to describe the same with reference to the accompanying drawings.

The frame 1, 1, 1, of the machine may be substantially constructed of wood or iron, or parts of each, which is mounted upon wheels 2, 2, 2, 2, on which it is moved and operated. A strong iron plow or scraper 3, is firmly and permanently attached to the frame, having a series of pointed teeth 4, 4, 4, for more easily entering the ground or earth, which take up the earth, elevates and deposits it upon an endless revolving apron or elevator 5, 5, 5, which carries it up and deposits it in the dumping hopper 6, having two gates or doors 7, 7, so hinged to it as that when closed they shall form its bottom. Two branches 8, 8, of the chain 9, of equal length are attached—one to each of said gates for the purpose of opening and closing them. A roller 10, 10 is placed horizontally across the dumping hopper, over which the chain 9 passes, to bring it into the proper position for closing the gates, and supporting the weight when the hopper is filled. A windlass shaft 11, 11, extends across the frame, around which the chain 9, is wound by means of the crank 12, and a ratchet wheel 13, is also fastened to this shaft, into which the pawl or catch 14 works, and keeps the gates closed. Two iron rods 15, 15, pass through the forward part of the frame 1, 1, and connect it (the frame) with the forward axletree; these rods slide loosely through the timber of the frame, so as to admit of its being raised or lowered on them at pleasure, for the purpose of allowing the plow 3, to enter the ground to any desired depth, or for raising it out when meeting any obstruction which it will not remove, or for moving it from place to place. An iron cap 16, is placed upon the top of these rods, and screwed down to them with nuts, so as to connect them firmly together. The chain 17, 17, is fastened to this cap 16 by means of an eyebolt, as shown at 18 (Fig. 2), and passes thence down around the grooved pulley 19, which is fixed in the timber, and thence up over the grooved pulley 20, which is supported above the cap piece 16, by ears standing up from it, and thence down to the windlass shaft 21, around which it is wound by means of the cogged wheel 22, which is keyed to the windlass shaft and meshes with the pinion 23 on the crank shaft 24. There are on each end of this shaft 24, cranks 25, 25, which are to be turned by the operator, for the purpose of raising or lowering the frame, and the plow with it, and for regulating the depth of the furrow. There is a ratchet wheel 26, on the crank shaft 24, into which the catch 27, works, and holds the shaft in any desired position.

28 is the forward axletree, and 29 the tongue of the machine to which the team is hitched when it is to be moved from place to place, and with which it is steered when in operation.

A large shaft 30, passes across the frame of the machine, and is secured to it by, and rests in, boxes, to which shaft is keyed at one of its ends, a large grooved pulley 31, said pulley being outside of the sills of the frame. Around this pulley a turn is taken with the main draft chain 32, which gives it a rotatory motion when the machine is moving forward. A toothed chain wheel 33, is fastened to the opposite end of the shaft from the grooved pulley, over and around which wheel, and a similar toothed wheel 35, which is on the shaft 36, running across the frame at the upper end of the elevator, passes the endless joint-linked belt chain 34. On the shaft 36, are two other toothed chain wheels 37, 37, which mesh into the two joint-linked chains to which the slats or lags of the elevator are fastened at their ends, so as to connect them together in the form of a broad belt, thus when the machine is in operation giving a continued onward motion to the elevator, said elevator running on friction pulleys 38, 38, 38, 38.

39, 39, are two pulleys around which the elevator revolves at its lower end. A strong iron loop 40 is secured to the frame of the machine, to which the main draft or capstan chain 32, is fastened when in operation. This chain passes forward (in the direction of the arrow as shown in the drawings) to a capstan drum, and after taking a sufficient number of turns around said drum to prevent the chain from slipping upon it, the slack end passes over a supporting roller on the capstan frame, and thence back to the excavator, and over the guide pulley 42, which is secured to the side of the excavator frame, and then takes a turn around the grooved chain pulley 31, to which it gives a rotary motion as before described; it then passes back under the rear guide pulley 43, to a point some two hundred and fifty feet distance from the capstan, where the sheave pulley 44, (Fig. 4) is fastened to an anchor in the ground; after passing around this pulley, it is then brought back under the rear part of the excavator, and fastened to the windlass shaft 45, around which the slack chain is wound up and tightened by means of the wheel 46, which is fastened to one end of this shaft, and has holes in its periphery in which a lever or bar may be inserted to turn said shaft, it being further provided with a ratchet-wheel 47, into which a pawl 48 works to prevent the shaft from turning backward.

The main draft chain together with the excavator forms a continuous circuit or belt, running around two pulleys at its extreme ends, viz: the capstan drum 41, at one end, and the pulley 44 (Fig. 4) at the other. This method of arranging the chain, takes the slack chain, which is continually being discharged from the capstan drum, entirely out of the way of itself, and keeps the coils of chain on the drum sufficiently tight to hold, without requiring a man to take off slack and keep the coils tight as in the usual method of using a capstan. By reversing the motion of the capstan drum, the excavator is drawn alternately backward and forward over that portion of the ground lying between the capstan and anchor pulley.

The anchor to which the pulley 44 (Fig. 4) is to be connected may consist of a strong frame of timber, sunk below the surface of the ground, so as to enable the carts or wagons which receive their load from the hopper of the excavator, to pass over it, and should extend clear across the road bed, or other ground to be excavated, and be provided with a series of hooks or chains at intervals in its length, to which the pulley 44 may be attached. This is for the purpose of allowing the excavator to work in longitudinal sections of the roadbed, the front end of the excavator, being guided or kept in said sections by snatch pulleys attached to posts at either side of the main chain, for drawing said main chain, out in line with the anchoring point for the time being.

Having thus fully described the nature of our invention what we claim therein as new, and desire to secure by Letters Patent is,

1. The placing of the excavating machines within the circuit of an endless chain, which passes over a pulley anchored at one point, and over or around a capstan at another point, so that the excavator shall form a part of the endless chain, and be drawn forward or backward and operated by it, substantially as described.

2. We also claim attaching one or both ends of the chain to a drum or shaft connected with the machine, so that the slack of the chain may be taken up on said drum or pulley shaft, to cause the machine to move steadily, without sudden strain; or, to let out the chain when it becomes necessary to draw it out of its direct line for guiding the machine in any desired direction, substantially as described.

J. A. H. ELLIS.
A. GORDON.

Witnesses:
A. B. STOUGHTON,
SAML. GRUBB.